(12) United States Patent  
Yamaguchi (10) Patent No.: US 6,558,045 B2
(45) Date of Patent: May 6, 2003

(54) HYBRID CONNECTOR AND ASSEMBLING METHOD THEREOF

(75) Inventor: Noboru Yamaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/879,159

(22) Filed: Jun. 13, 2001

(65) Prior Publication Data

US 2002/0001437 A1 Jan. 3, 2002

(30) Foreign Application Priority Data

Jul. 3, 2000 (JP) ........................................ 2000-201340

(51) Int. Cl.$^7$ ................................................ G02B 6/38
(52) U.S. Cl. ........................................ 385/75; 439/577
(58) Field of Search ...................... 385/75, 53; 439/577

(56) References Cited

U.S. PATENT DOCUMENTS

| | | | | |
|---|---|---|---|---|
| 4,993,803 A | * | 2/1991 | Suverison et al. | 439/577 |
| 6,113,280 A | * | 9/2000 | Nagaoka et al. | 385/53 |
| 6,217,230 B1 | * | 4/2001 | Matsushita | 385/78 |
| 6,341,899 B1 | * | 1/2002 | Shirakawa et al. | 385/88 |
| 6,357,931 B1 | * | 3/2002 | Shirakawa et al. | 385/75 |
| 2002/0002003 A1 | * | 1/2002 | Yamaguchi | 439/607 |
| 2002/0004336 A1 | * | 1/2002 | Yamaguchi | 439/577 |

FOREIGN PATENT DOCUMENTS

JP              9-61677          3/1997

* cited by examiner

*Primary Examiner*—Lynn D. Feild
*Assistant Examiner*—Hae Moon Hyeon
(74) *Attorney, Agent, or Firm*—Armstrong, Westerman & Hattorri, LLP (57) ABSTRACT

The hybrid connector (1) is completed through first to third assembling steps. The first assembling step inserts sleeves (7, 7) into cylindrical holders (19, 19) to an intermediate insertion state thereof. The second assembling step presses optical element modules (8, 9) against the sleeves (7,7), which consistently further inserts the sleeves (7, 7) into the cylindrical holders (19,19) so that the sleeves (7, 7) are completely received in the cylindrical holders (19, 19). Whereby the second assembling step simultaneously completely assembles the sleeves (7, 7) and the optical element modules (8, 9) into the connector. This provides an effective assembling work thereof. The third assembling step causes a shield case (10) to hold the optical element modules (8, 9), while the shield case 10 engages with the cylindrical holders 19, 19.

6 Claims, 5 Drawing Sheets

FIG. 14

HYBRID CONNECTOR AND ASSEMBLING METHOD THEREOF

BACKGROUND OF THE INVENTION

1. Field of the Invention

The present invention relates to a hybrid connector integrally having an electrical connector portion and an optical connector portion which are completed through simplified assembling steps.

2. Related Art

Invarious types of vehicles such as an automobile, there are provided an extremely large number of signals from various sensors and control signals for various electronic instruments. When each control signal is transmitted through each individual signal path line, a large number of signal path lines are required, so that a wiring harness thereof undesirably becomes heavy. Furthermore, various types of recent electronic instruments require transmitting information having a larger capacity and a higher density, also resulted in a heavy weight wiring harness thereof. Therefore, a recent wiring harness partially includes optical fiber cables (or optical fiber cords), for example, for connection between nodes of the wiring harness.

Partial replacement of electrical cables with optical cables in the wiring harness may cause a complicated connection work of electrical connector portions and optical connector portions, for example, in a car production process. Thus, recently, a hybrid connector integrally having an electrical connector portion and an optical connector portion has been developed for practical use. A pair of such hybrid connectors are brought to a complete state of electrical and optical connection by a single coupling step.

However, such a hybrid connector integrally having an electrical connector portion and an optical connector portion includes a large number of parts. Furthermore, the optical connector portion requires a laborious assembling step, causing an increased man hour thereof.

SUMMARY OF THE INVENTION

In view of the above-mentioned disadvantage, an object of the present invention is to provide a hybrid connector and an assembling method in which the hybrid connector is completed with ease.

For achieving the object, the present invention provides an assembling method of a hybrid connector integrally having an electrical connector portion and an optical connector portion, the optical connector portion including at least one optical element module having an optical element, a sleeve provided with an optical waveguide, a housing formed with a cylindrical holder, and a case for holding the optical element modules. The housing also accommodates the electrical connector portion. The method includes:

a first assembling step for inserting the sleeve into the cylindrical holder until a half insertion state of the sleeve into the cylindrical holder, a second assembling step for pressing the optical element module against an end surface of the sleeve so that the sleeve is further inserted into the cylindrical holder to become in a complete insertion state, and a third assembling step for engaging the case with the cylindrical holder with the optical element module being held by the case so that the optical element module is secured at its final position.

The first assembling step inserts the sleeve into the cylindrical holder until a half insertion state thereof. The second assembling step further urges the optical element module against the sleeve, which further inserts the sleeve into the cylindrical holder to be completely received in the cylindrical holder. The second assembling step assembles simultaneously the sleeve and the optical element module into the connector. This provides an effective assembling work thereof.

Since the optical element module pushes the sleeve into the cylindrical holder, a clearance optical loss between the sleeve and the optical element module becomes minimum.

The third assembling step causes the case to hold the optical element module while the case engages with the cylindrical holder. Thereby, the optical element module is finally positioned, enabling a simplified simultaneous assembling step of the optical element module and the case.

Preferably, the first assembling step includes that the sleeve is inserted into the cylindrical holder until the sleeve abuts against a resilient protrusion formed in the cylindrical holder, and the second assembling step includes that the sleeve is further inserted into the cylindrical holder while the resilient protrusion is depressed by the sleeve.

Thus, in the first assembling step, the sleeve is smoothly inserted into the cylindrical holder, enabling an efficient assembling step. Meanwhile, in the second assembling step, the sleeve is pressed into the cylindrical holder against the depressed protrusion. This provides an adequate insertion force to finally position the sleeve in the cylindrical holder.

Further preferably, the first assembling step moves the sleeve into the cylindrical holder by a first distance, while the second assembling step moves the sleeve into the cylindrical holder by a second distance, the second distance being smaller than the first distance.

Thus, the press-fit insertion work of the sleeve is minimized.

The present invention provides a plug-type hybrid connector integrally having an electrical connector portion and an optical connector portion. The optical connector portion comprises at least one optical element module having an optical element, a sleeve provided with an optical waveguide, a housing formed with a cylindrical holder, and a case for holding the optical element modules. The housing also accommodates the electrical connector portion. The optical element module can push an end surface of the sleeve so that the sleeve is inserted into the cylindrical holder to become in a complete insertion state, and the case can engage with the cylindrical holder with the optical element module being held by the case so that the optical element module is secured at its final position.

Preferably, the cylindrical holder has a resilient protrusion formed in the cylindrical holder. The sleeve abuts against the resilient protrusion at a half insertion state of the sleeve into the cylindrical holder. The resilient protrusion is depressed by the sleeve to press-fit the sleeve at a complete insertion state of the sleeve into the cylindrical holder.

Preferably, the resilient protrusion is positioned such that a first distance of the sleeve into the cylindrical holder for reaching the half insertion state is larger than a second distance of the sleeve into the cylindrical holder for moving the sleeve from the half insertion state to the complete insertion state.

DETAILED DESCRIPTION OF THE PREFERRED EMBODIMENTS

Referring to the accompanied drawings, an embodiment of the present invention will be discussed hereinafter.

FIGS. 1 to 5 are views showing a hybrid connector of an embodiment of the present invention.

Note that the hybrid connector decried herein has an electrical connector portion and an optical connector portion which are integrated with each other.

Figure 1:
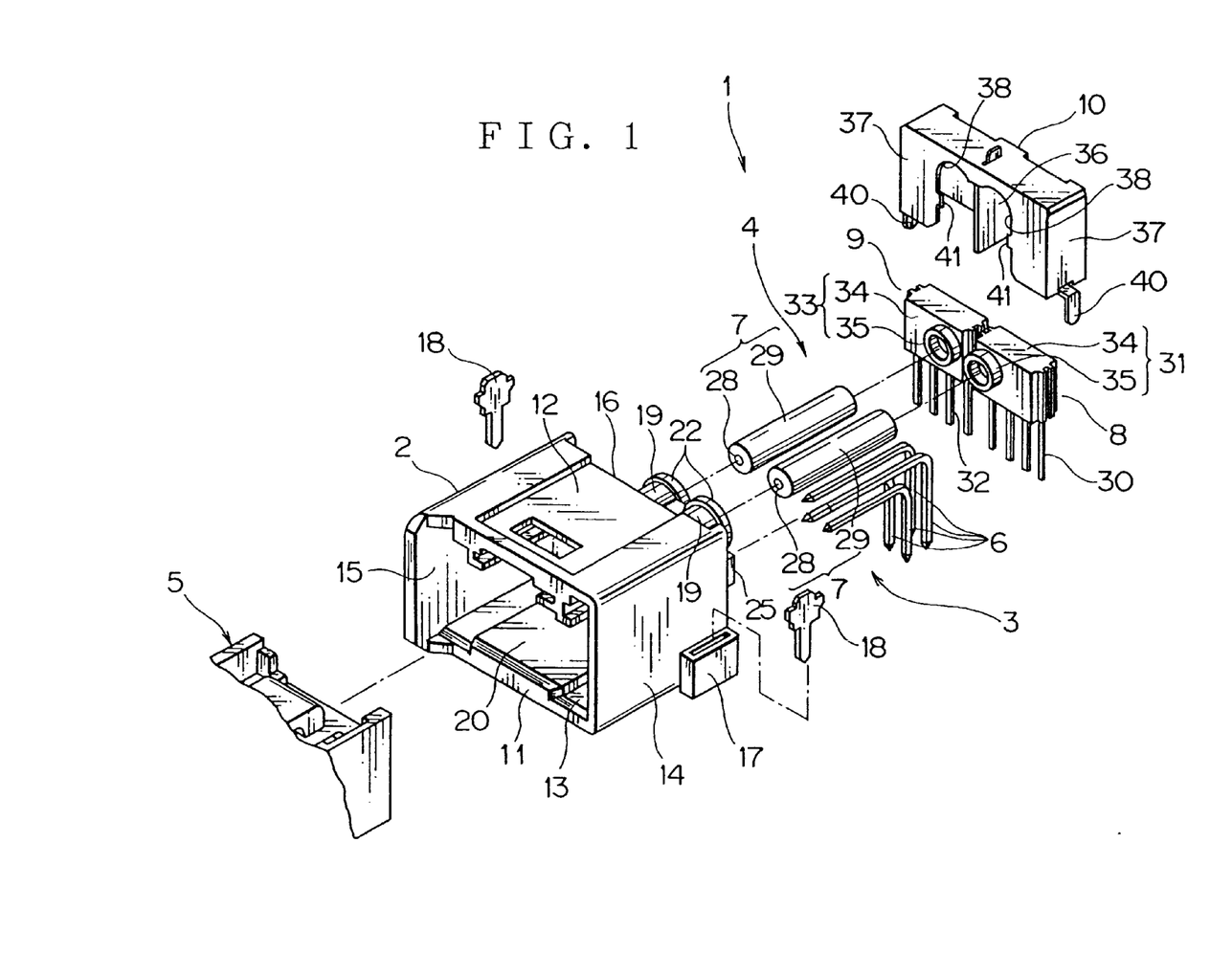
FIG. 1 is an exploded perspective view showing a hybrid connector of an embodiment of the present invention.
Figure 2:
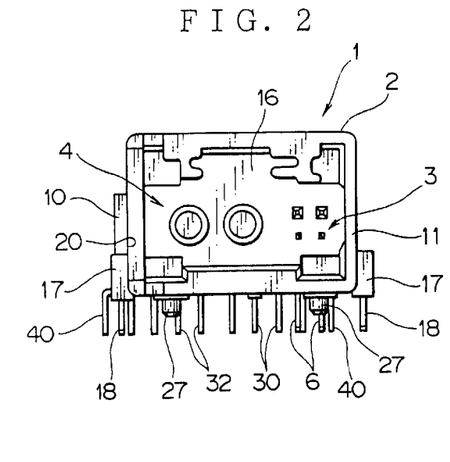
FIG. 2 is a front view showing the hybrid connector.
Figure 3:
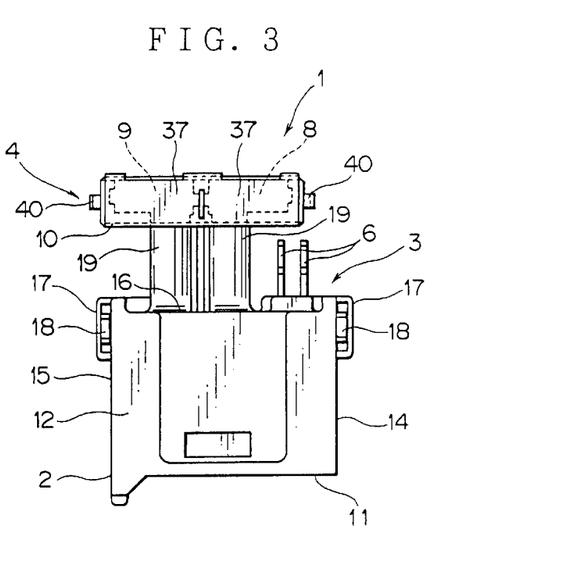
FIG. 3 is a plan view showing the hybrid connector.
Figure 4:
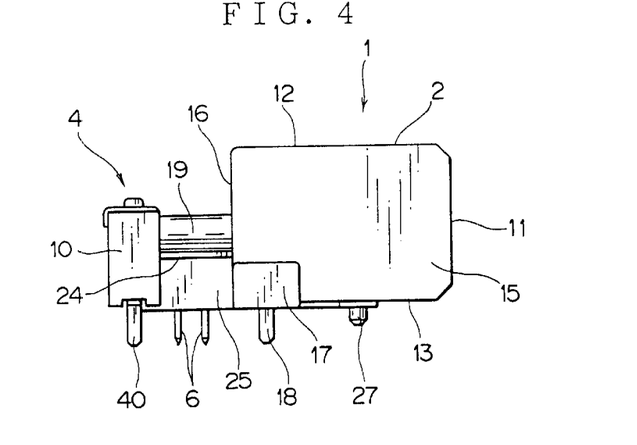
FIG. 4 is a left side view showing the hybrid connector.

In FIG. 1, reference 1 designates a plug-type hybrid connector arranged on a printed circuit board (not shown). The hybrid connector 1 has a housing 2 accomodating an electrical connector portion 3 and an optical connector portion 4. The hybrid connector 1 according to the present invention can be assembled with ease as described later.

The hybrid connector 1 is coupled to a receptacle type opposing connector 5 which has a housing accomodating ferrules which receive ends of two optical cables (not shown). One of the optical cables is used for transmitting signals and the other for receiving signals. The ferrule has an end at which an optical fiber consisting of a cores and a plastic clad is exposed. The cores align with axes of waveguides 28, 28 of sleeves 7, 7 described later.

The electrical connector portion 3 is constituted by the housing 2 and an electrical terminal 6, for example, for a printed circuit board. Meanwhile, the optical connector portion 4 is constituted by the housing 2, the sleeves 7, 7, optical element modules 8, 9, and a shield case 10. Note that the optical element modules 8, 9 of the optical connector portion 4 are also called as light receiving/emitting modules, or fiber optic transceivers (FOT). The shield case 10 corresponds to the case described in the invention summary.

Figure 5:
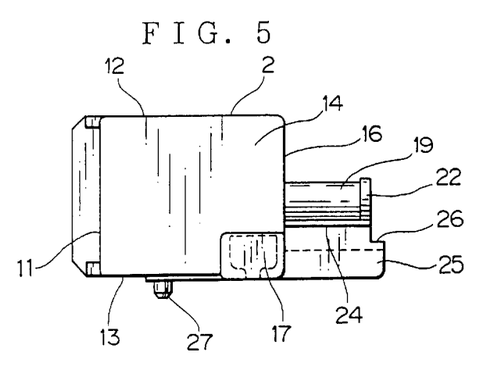
FIG. 5 is a right side view showing the hybrid connector.

Next, referring to FIG. 1 or 5, the hybrid connector 1 will be discussed about the constitution components thereof. Furthermore, an assembling method of hybrid connector 1 will be also discussed in detail hereinafter.

The housing 2 is made of an insulating synthetic material and is defined in a rectangular shape having an opened front face 11. The housing 2 has an upper wall 12, a lower wall 13, a right side wall 14, a left side wall 15, and an inner wall 16. The upper wall 12 is provided with a lock portion engaged with a locking arm formed on the opposing connector 5. The right side wall 14 and the left side wall 15 each are formed with a pin receiving pockets 17 engaged with a metal fixing pin 18. The pin receiving pockets 17 has a through hole opened toward the printed circuit board. The fixing pin 18 is fixed to the printed circuit board via the through hole.

The inner wall 16 of the housing 2 is formed unitarily with a pair of cylindrical holders 19, 19. The cylindrical holders 19, 19 each are a cylinder having a circular inner diameter and has a length corresponding to the sleeve 7. The cylindrical holders 19, 19 are extended in an engagement chamber .20 receiving the opposing connector 5. The engagement chamber 20 is surrounded by the upper wall 12, the lower wall 13, the right side wall 14, the left side wall 15, and the inner wall 16. Each cylindrical holder 19 protrudes into the engagement chamber 20. The ferrule is inserted from the side of the engagement chamber 20.

Figure 6:
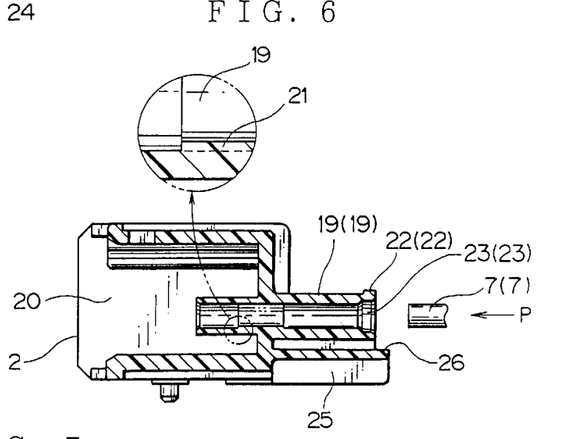
FIG. 6 is a sectional view showing a state before insertion of the sleeve for illustrating a first assembling step.

The cylindrical holders 19 has an inner intermediate surface formed with three protrusions 21 (see FIG. 6). The three protrusions 21 each are elongated in a longitudinal direction of the cylindrical holder 19 and are transversely spaced from each other with a 120° pitch. The protrusion 21 has a projection height which is depressed by the sleeve 7 when the sleeve 7 is pressed into the cylindrical holder 19. The cylindrical holder 19 has an inner diameter such that the sleeve 7 may be smoothly inserted into the cylindrical holder 19 before engaging with the protrusions 21.

The cylindrical holder 19 is unitarily formed with an engagement piece 22 at an end thereof, from which the sleeve 7 is inserted. The engagement piece 22 is substantially circular. The engagement piece 22 is formed with a recess 23 coaxial with the cylindrical holder 19 (see FIG. 6 or 15). Each of the side walls 14 and 15 is formed with a shoulder 24 at an inner surface thereof. The shoulder 24 is opposed to the sleeve 7. The lower wall 13 is formed with a leg 25.

The engagement piece 22 has a radial thickness enough for providing a rigidity which resists against a force in an axial direction of the cylindrical holder 19. The engagement piece 22 is constructed so as to engage with the shield case 10.

The recess 23 has an inner diameter larger than that of the cylindrical holder 19 such that the recess 23 engages with a projections 35 (discussed later) of the optical element module 8 or 9. The shoulder 24 is parallel to an axial direction of the cylindrical holder 19 and engages with a disengagement prevention piece 41 (discussed later) of the shield case 10.

The leg 25 has a generally H-shaped section. In parallel to the cylindrical holder 19, there is provided a wall 26 extended rearward longer than the cylindrical holder 19. The wall 26 is a stopper for preventing turn of 8, 9. The wall 26 has a flat surface.

The lower wall 13 of the housing 2 is unitarily formed with projections 27, 27 inserted into the printed circuit board.

The electrical terminal 6 is a conventional L-shaped pin terminal. One half of the L-shaped terminal passes through the inner wall 16 to be inserted into the engagement chamber 20 of the housing 2, while the other half is secured to the printed circuit board. There are provided two pairs of the electrical terminals 6, one pair being positioned above the other pair in the housing 2. Thus, the pin length of the one pair is different from that of the other pair.

The sleeves 7, 7 each are constituted by a waveguide 28 and a cylindrical holder 29, and the waveguide 28 consists of a core and a clad. Note that, preferably, the waveguide 28 has a reflective index equal to that of the core of the optical fiber cable. The sleeve 7 may be defined by a pre-determined length optical fiber cable each end of which is ground.

The optical element module 8 has a plurality of lead frames 30, a molded body (not shown), and a shell 31. One of the lead frames 30 is a light emitting element (not shown) which is connected by wirebonding. An lower end of each lead frame 30 is secured to the printed circuit board by soldering. The light emitting element is preferably located at a position in a side of the optical element module 9 apart from the center of the optical element module 8 (or the center of the molded body). This arrangement can make the hybrid connector 1 compact. Note that the light emitting element corresponds to the optical element described in the invention summary, and the light emitting element is, for example, a light emitting diode (LED).

The molded body is made of a light-propagating transparent material (for example, an epoxy resin), and, preferably, the molded body have a reflective index equal to that of the core of the optical fiber cable. An upper half portion of each lead frame 30 is embedded in the molded body. The molded body protects the light emitting element.

The optical element module 9 has a plurality of lead frames (lead terminals) 32, a molded body (not shown), and a shell 33. The molded body is substantially the same as the above-mentioned one and will not be discussed again. One of the shells 31, 33 accomodates a light receiving element (not shown) which is connected by wirebonding. An lower end of each shell 31 or 33 is secured to the printed circuit board by soldering. The light receiving element is preferably located at a position in a side of the optical element module 8 apart from the center of the optical element module 9 (or from the center of the molded body). This arrangement can make the hybrid connector 1 compact. Note that the light receiving element corresponds to the optical element described in the invention summary, and the light receiving element is, for example, a photodiode (PD).

In the embodiment, the light emitting element and the light receiving element are positioned to come toward each other, which makes the hybrid connector 1 compact. Apart of the optical element module 8 is located above the electrical terminals 6, thereby making hybrid connector 1 further compact.

The shells 31, 33 are made of an electrically conductive synthetic resin material including, for example, carbon fibers or may be made of an insulating synthetic resin material. Each shell 31 or 33 has a main shell 34 covering the mold body and a cylindrical projection 35 projecting from the main shell 34.

The main shell 34 is defined in a box-shape having a bottom. The molded body is inserted into the main shell 34 with a small press-fit force. The main shell 34 has an open end for inserting the molded body, and the open end is flat so as to be supported by the wall 26 at assembling thereof. Another flat wall is provided so as to be opposed to the open end and is also flat.

The projections 35, 35 are positioned to correspond to the light emitting element (not shown) and the light receiving element (not shown). The projections 35, 35 engage with the recess 23 at assembling thereof.

The shield case 10 is defined by press-forming an electrically conductive thin metal plate. The shield case 10 has a resiliency useful for assembling thereof. The shield case 10 has a pair of insertion chambers 37, 37 separated by a partition 36. Each insertion chamber 37 has a U-shaped cutout 38 and a protrusion 39 (see FIG. 12) urging the optical element module 8 or 9 toward the cutout 38 and has a leg 40 fixed to the printed circuit board.

The insertion chambers 37, 37 receive the optical element modules 8, 9 together with the engagement pieces 22, 22, and the optical element modules 8, 9 are held by the insertion chambers 37, 37 with a press-fit state due to the resiliency of the shield case 10.

Note that, when the optical element modules 8, 9 each have a resiliency for pressing itself against an end surface of the cylindrical holders 19, the shield case 10 may be made of an electrically conductive synthetic resin material including carbon fibers. The electrically conductive shield case 10 can well shield the optical element modules 8, 9.

The cutout 38 is defined so as to fit with an outer diameter of the cylindrical holder 19. The cutout 38 has an inner edge formed with a disengagement prevention protrusion 41 projected inwardly. The disengagement prevention protrusion 41 engages with the shoulder 24 of the cylindrical holder 19, when the shield case 10 is combined with the cylindrical holder 19. The disengagement prevention protrusion 41 prevents disengage of the shield case 10 from the cylindrical holder 19.

Figure 12:
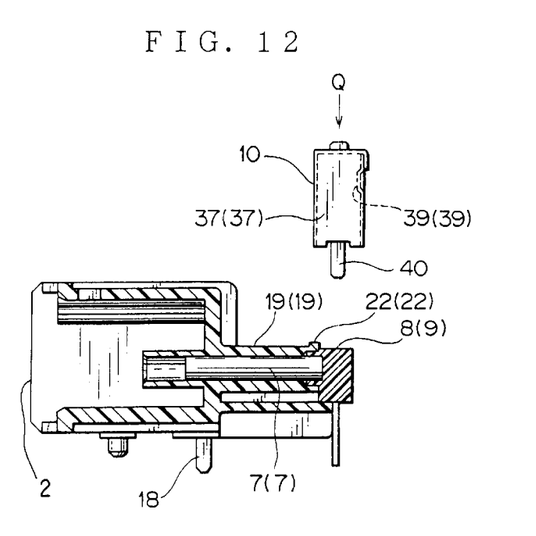
FIG. 12 is a sectional view showing a state before assembling a shield case for illustrating a third assembling step.

The protrusions 39, 39 (one of them is illustrated in FIG. 12) are formed on an rear wall of the shield case 10. The rear wall is opposed to the front wall formed with the cutouts 38, 38. Each protrusion 39 is defined, for example, in an oval figure by partially embossing the rear wall toward the cutout 38. Each leg 40 is extended from each side wall of the insertion chamber 37 and is secured to the printed circuit board. The leg 40 also functions as a ground terminal.

Next, a method for assembling hybrid connector 1 will be discussed in detail. Note that the electrical terminals 6 have been preliminarily assembled in the housing 2, and assembling steps of the optical connector portion 4 will be described hereinafter.

After a part related to the electrical connector portion 3 is assembled, another part related to the optical connector portion 4 is assembled sequentially through first to third assembling steps.

Figure 7:
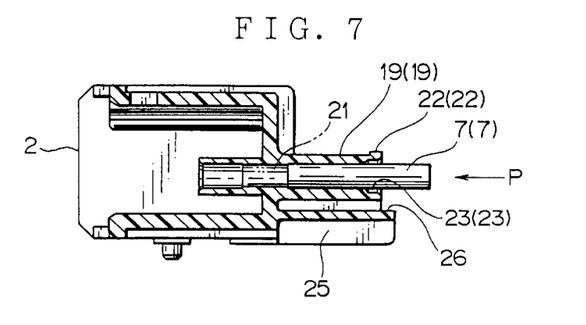
FIG. 7 is a sectional view showing a state in which the sleeve is in a half way insertion state for illustrating the first assembling step.
Figure 8:
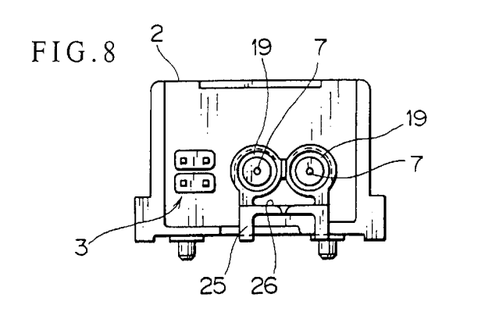
FIG. 8 is a rear view showing the state of FIG. 7.

Referring to FIGS. 6 to 8, the first assembling step will be discussed. FIG. 6 is a sectional view showing a state before insertion of the sleeve. FIG. 7 is a sectional view showing a state in which the sleeve is in a half insertion state. FIG. 8 is a rear view showing the state of FIG. 7.

In FIG. 6, the sleeves 7, 7 are moved toward ends of the cylindrical holders 19, 19 in an arrow head P direction with side surfaces of the sleeves 7, 7 being held by hand. Then, the sleeves 7, 7 are inserted into the cylindrical holders 19, 19 along the arrow head P, so that the protrusion 21 abuts against the forwarding end of the sleeves 7 as illustrated in FIG. 7. Thus, the sleeves 7, 7 each become in a halfway insertion state into the cylindrical holders 19, 19. After the half-way insertion state illustrated in FIG. 8, the second assembling step will be carried out.

Figure 9:
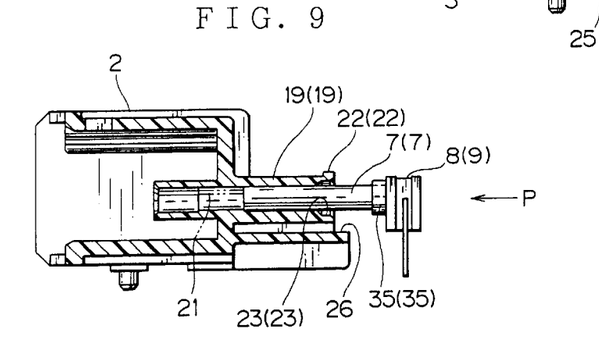
FIG. 9 is a sectional view showing a state in which an optical element module begins to push the sleeves for illustrating a second assembling step.
Figure 10:
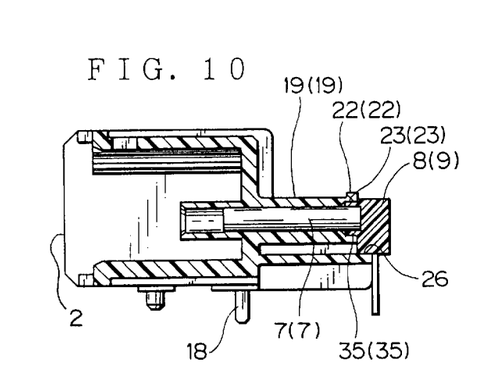
FIG. 10 is a sectional view showing a state in which the optical element module has completely inserted the sleeves into the cylindrical holder 19 for illustrating the second assembling step.
Figure 11:
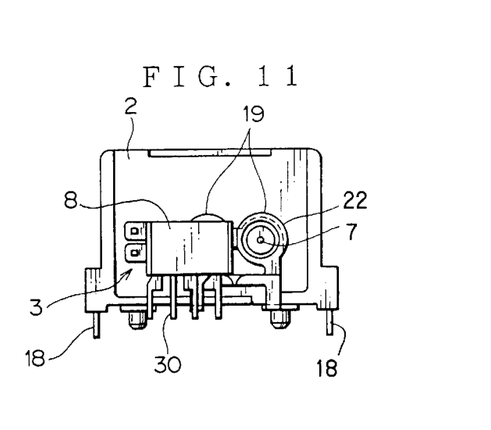
FIG. 11 is a rear view of the illustration of FIG. 10.

Referring to FIGS. 9 to 11, the second assembling step will be discussed. FIG. 9 is a sectional view showing a state in which the optical element module begins to push the sleeves 7, 7. FIG. 10 is a sectional view showing a state in which the optical element module has completely inserted the sleeves 7, 7 into the cylindrical holders 19, 19. FIG. 11 is a rear view of the illustration of FIG. 10.

As illustrated in FIG. 9, in the second assembling step, the optical element modules 8, 9 are aligned with the end faces of the sleeves 7, 7 exposed from the cylindrical holders 19, 19. The end faces of the sleeves 7, 7 are received in the projections 35, 35 of the optical element modules 8, 9. Furthermore, the optical element modules 8, 9 are pushed in the arrow head P direction, so that the sleeves 7, 7 depress the protrusions 21, 21 to be further inserted into the cylindrical holders 19, 19 until a complete insertion state thereof as illustrated in FIG. 10. The projections 35, 35 of the optical element modules 8, 9 are inserted into the recesses 23, 23 of the cylindrical holders 19, 19 to engage with them, so that the light emitting element and the light receiving element align with axes of the sleeves 7, 7 or of the cylindrical holders 19, 19. The optical element modules 8, 9 are restricted in a turning movement thereof by the wall 26 (see FIGS. 10 and 11). The fitting of the fixing pins 18, 18 may be carried out in this step.

Thus, the optical element modules 8, 9 complete the insertion of the sleeves 7, 7. Between the sleeves 7, 7 and the optical element modules 8, 9, there are no clearances, which minimizes a light clearance loss of thereof. Moreover, the projections 35, 35 of the optical element modules 8, 9 are inserted into the recesses 23, 23 of the cylindrical holders 19, 19, so that the axes of them align with each other, decreasing an optical loss due to misalignment of the axes.

In the second assembling step, the optical element modules 8, 9 push the end surfaces of the sleeves 7, 7, which eliminates a hand work for pushing the end surfaces of the sleeves 7, 7. This prevents contamination of the end surfaces of the sleeves 7, 7 due to a hand work, providing no decrease in a light transmission efficiency.

Figure 14:
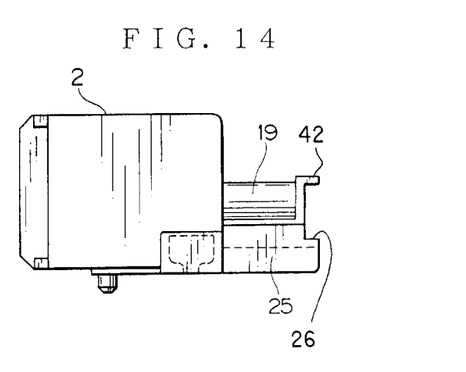
FIG. 14 is a left side view showing another housing.
Figure 15:
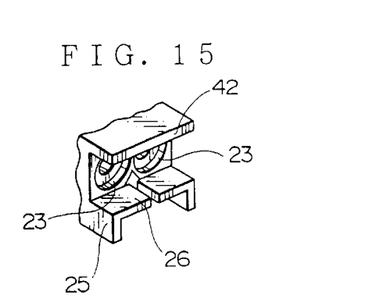
FIG. 15 is a perspective view showing primary parts of FIG. 14.

As illustrated in FIGS. 14, 15, there is provided a second wall 42 opposed to the wall 26 so that the walls partially pinch the optical element modules 8, 9, surely preventing the turning of the optical element modules 8, 9. Thereby, the shield case 10 is assembled with ease in the third assembling step.

Figure 13:
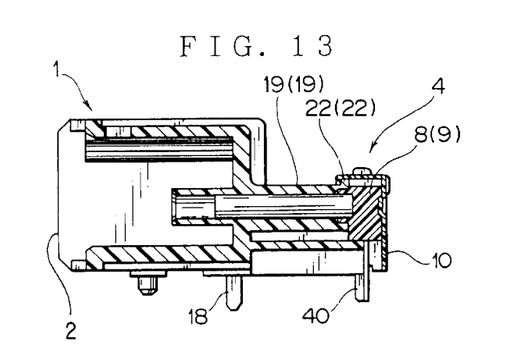
FIG. 13 is a sectional view showing a state after assembling the shield case.

After the complete insertion of the sleeves 7, 7, the third insertion step is carried out. Referring to FIGS. 12 and 13, the third assembling step will be discussed. FIG. 12 is a sectional view showing a state before assembling the shield case, and FIG. 13 is a sectional view showing a state after assembling the shield case.

As illustrated in FIG. 12, the third assembling step moves the shield case 10 in an arrow head Q direction. The shield case 10 engages with the engagement pieces 22, 22, while the shield case 10 holds the optical element modules 8, 9. The shield case 10 pushes the optical element modules 8, 9 so that the optical element modules 8, 9 are brought in intimate contact with the end surfaces of the cylindrical holders 19, 19. Thereby, the optical element modules 8, 9 are located at their final positions.

Since the optical element modules 8, 9 are restricted in a turning movement thereof, the shield case 10 is surely assembled with ease.

As described above, the first to third assembling steps accomplish the assembling of the optical connector portion 4 of hybrid connector 1.

In summary, the first assembling step inserts the sleeves 7, 7 into the cylindrical holders 19, 19 until a half insertion state thereof. The second assembling step further urges the optical element modules 8, 9 against the sleeves 7, 7. Thereby, the sleeves 7, 7 are further inserted into the cylindrical holders 19, 19 to be completely received in the cylindrical holders 19, 19. The second assembling step assembles simultaneously the sleeves 7, 7 and the optical element modules 8, 9 into the connector. This provides an effective assembling work thereof. The third assembling step causes the shield case 10 to hold the optical element modules 8, 9, while the shield case 10 engages with the cylindrical holders 19, 19. Thereby, the optical element modules 8, 9 are finally positioned, enabling a simplified simultaneous assembling step of the optical element modules and the case. Preferably, the first assembling step moves the sleeves 7, 7 into the cylindrical holders 19, 19 by a first distance, while the second assembling step moves the sleeves 7, 7 into the cylindrical holders 19, 19 by a second distance. The second distance is smaller than the first distance. Thus, the press-fit insertion work of the sleeves is minimized.

Note that the embodiment can be modified within the spirit of the present invention. The assembling method described of the present invention may be applied to a general optical connector or a connector having a single core for bidirectional optical transmission.

What is claimed is:

1. An assembling method of a plug-type hybrid connector integrally having an electrical connector portion and an optical connector portion, the optical connector portion including at least one optical element module having an optical element, a sleeve provided with an optical waveguide, a housing formed with a cylindrical holder, and a case for holding the optical element modules, the housing also accommodating the electrical connector portion, the method comprising:

a first assembling step for inserting the sleeve into the cylindrical holder until a part insertion state of the sleeve into the cylindrical holder is achieved, a second assembling step for pressing the optical element module against an end surface of the sleeve so that the sleeve is further inserted into the cylindrical holder to become in a complete insertion state, and a third assembling step for engaging the case with the cylindrical holder with the optical element module being held by the case so that the optical element module is secured at its final position.

2. The method set forth in claim 1, wherein the first assembling step includes that the sleeve is inserted into the cylindrical holder until the sleeve abuts against an end of a resilient protrusion formed in the cylindrical holder, and the second assembling step includes that the sleeve is further inserted into the cylindrical holder beyond the abutted end of the protrusion while the resilient protrusion is depressed by the sleeve.

3. The method set forth in claim 2, wherein the first assembling step moves the sleeve into the cylindrical holder to the end of the protrusion representing a first distance, while the second assembling step moves the sleeve into the cylindrical holder beyond said end of the protrusion representing a second distance, the second distance being smaller than the first distance.

4. A plug-type hybrid connector integrally having an electrical connector portion and an optical connector portion, the optical connector portion comprising at least one optical element module having an optical element, a sleeve provided with an optical waveguide, a housing formed with a cylindrical holder, and a case for holding the optical element modules, the housing also accommodating the electrical connector portion, wherein the optical element module can push an end surface of the sleeve so that the sleeve is inserted into the cylindrical holder to become in a complete insertion state, and the case can engage with the cylindrical holder with the optical element module being held by the case so that the optical element module is secured at its final position.

5. The hybrid connector set forth in claim 4, wherein the cylindrical holder has a resilient protrusion formed in the cylindrical holder, the sleeve abutting against the end of the resilient protrusion at a part insertion state of the sleeve into the cylindrical holder, the resilient protrusion being depressed by the sleeve to press-fit the sleeve at a complete insertion state of the sleeve into the cylindrical holder.

6. The hybrid connector set forth in claim 5, wherein the resilient protrusion is positioned such that its end defines a first distance to move the sleeve into the cylindrical holder for reaching the part insertion state, and said first distance is larger than a second distance the sleeve is moved into the cylindrical holder beyond the end of the protrusion for moving the sleeve from the part insertion state to the complete insertion state.

* * * * *